United States Patent [19]
Saunders

[11] Patent Number: 4,779,959
[45] Date of Patent: Oct. 25, 1988

[54] LIQUID CRYSTAL ELECTRO-OPTIC MODULATOR IN A FABRY-PEROT INTERFEROMETER

[75] Inventor: Frances C. Saunders, Worcester, England

[73] Assignee: The Secretary of State for Defence in Her Britannic Majesty's Government of the United Kingdom of Great Britain and Northern Ireland, London, England

[21] Appl. No.: 93,038

[22] Filed: Sep. 4, 1987

[30] Foreign Application Priority Data

Sep. 5, 1986 [GB] United Kingdom ............... 862138

[51] Int. Cl.⁴ .............................................. G02F 1/13
[52] U.S. Cl. ................................... 350/346; 350/332; 350/347 E; 350/347 V; 350/350 S
[58] Field of Search ................. 350/332, 346, 347 E, 350/347 V, 350 S

[56] References Cited
U.S. PATENT DOCUMENTS

Re. 32,521 10/1987 Fergason ..................... 350/347 EX
3,694,053  9/1972 Kahn .............................. 350/347 E
3,891,307  6/1975 Tsukamoto et al. ............ 350/346 X
4,272,195  6/1981 Kaye .............................. 350/347 EX
4,444,469  4/1984 Kaye .............................. 350/347 E
4,566,758  1/1986 Bos ................................ 350/347 EX
4,595,292  6/1986 Amodeo et al. ............... 350/347 VX Primary Examiner—Stanley D. Miller
Assistant Examiner—Richard Gallivan
Attorney, Agent, or Firm—Nixon & Vanderhye

[57] ABSTRACT

An electro-optic modulator consists of a Fabry-Perot etalon containing intra-cavity liquid crystal material between mirror layers. Each mirror bears a respective rubbed polyimide layer, which provides homogeneous alignment of the liquid crystal molecules. The mirror layers are connected to a bias voltage source, which provide an electrical bias variable between two values both above the threshold for refractive index sensitivity to applied voltage. For nematic materials, this is the Freedricks threshold or transition. The bias variation provides optical modulation of the etalon transmission with a time constant which is much shorter than devices switching between voltages either side of the threshold.

10 Claims, 3 Drawing Sheets

LIQUID CRYSTAL ELECTRO-OPTIC MODULATOR IN A FABRY-PEROT INTERFEROMETER

BACKGROUND OF THE INVENTION

The invention relates to an electro-optic modulator of the kind which may be arranged to modulate a light beam in response to electrical bias. More particularly, the invention relates to an electro-optic modulator in the form of a Fabry-Perot interferometer or etalon having intra-cavity liquid crystal material.

Fabry-Perot etalons containing liquid crystal material are known. They are described in the following references $R_1$ to $R_5$:

$R_1$: Offenlegungsschrift DE No. 31,48,427 Al,
$R_2$: Offenlegungsschrift DE No. 34,25,584 Al,
$R_3$: European patent application No. 0,135,003,
$R_4$: Cheung, Durbin and Shen, Optics Letters, Vol. 8, No. 1, January 1983, pages 39–41, and
$R_5$: Khoo, Normandin and SO, J. Appl. Phys. 53(11), November 1982, pages 7599–7601.

$R_1$ describes a Fabry-Perot etalon comprising two spaced apart semireflective mirrors with a liquid crystal material sandwiched between them. The mirrors or electrode layers applied to them provide a means for applying a bias voltage across the liquid crystal material. Altering the applied bias changes the refractive index of the liquid crystal material, which in turn changes the optical path length in the Fabry-Perot etalon and alters the etalon transmission wavelength. $R_1$ is however entirely silent regarding the type and chemical composition of the liquid crystal material to be employed, and also regarding the bias voltage to be applied to this material and its molecular alignment relative to the mirrors or cell walls. In the related field of nematic liquid crystal display devices, bias voltages are normally employed which switch the material from below to above its Freedricks transition. Below this transition, the refractive index of a nematic liquid crystal material is substantially independent of applied voltage. Immediately above the Freedricks transition voltage $V_F$ the refractive index is extemely sensitive to applied voltage, but the rate of change of refractive index as a function of applied voltage reduces with increasing voltage. A typical nematic material cell has a $V_F$ of 1 volt and is switched between 0 and 2 volts.

$R_2$ describes a liquid crystal cell in which the liquid crystal phase is the so-called blue phase (BP), of which there are two forms, BP1 and BP2. The blue phase exhibits practically no birefringence and produces selective reflection by virtue of the cholestertic phase; ie it behaves in an optically isotropic manner and reflects in a narrow wavelength range. $R_2$ refers to earlier work on liquid crystal cells, in which the time required to switch the molecular orientation and hence change the cell's optical properties is about 10 milliseconds or more. This switching time is too great for the purposes of processing video information with associated high data rates. The invention disclosed in $R_2$ relates to obtaining optical anisotropy in blue phase liquid crystal material, which is normally optically isotropic. However, in FIG. 3 and page 10 lines 18 onwards, $R_3$ discloses a phase change from BP1 to a cholesteric phase at a temperature of 44° C. and an applied voltage of over 50 volts. This is associated with a substantial change or discontinuity in the optical anisotropy δn/n from virtually zero to an appreciable positive value. As set out in $R_2$, page 7, lines 1–15, the switching time associated with this preservation of blue phase optical anisotropy is at most 1 millisecond. This compares with 10 milliseconds for previous devices as has been said, and with 0.1 second for the reaction time of what $R_2$ refers to as the known colour displacement effect. However, the operating temperature at which the change from PB1 to cholesteric occurs is fairly critical. It occurs in one material at 44° C., whereas at 44.5° C. and 48.4° C. respectively the BP2 and isotropic phases are observed. At page 9, lines 22–27, $R_2$ mentions a different liquid crystal material in which the transitions cholesteric-BP1-BP2-isotropic occur in the temperature interval 26° C.–28° C.

$R_2$ accordingly describes a liquid crystal which requires temperature control above ambient temperature to a stability of less than 1° C. In this connection it is noted that the specific embodiment of $R_2$ incorporates a heater. Furthermore, $R_2$ requires use of a voltage of about 50 volts, ten or more times that employed in conventional integrated circuit technology. The need for a heater increases power consumption requirements.

$R_3$ describes a Fabry-Perot etalon containing intra-cavity liquid crystal material such as cyanobiphenyl or phenylcyclohexane. The etalon is arranged between two pairs of parallel electrodes, one pair being perpendicular to the other. The optical path length in the etalon cavity is modulated by varying the electric field between the electrodes. In this way coherent radiation may be distinguished from incoherent radiation. $R_3$ is however silient regarding the frequency of modulation, ie there is no information regarding the operating speed of the device.

$R_4$ discloses a liquid crystal-filled Fabry-Perot etalon in which optical bistability is demonstrated as a function of varying light intensity, the etalon being placed in a magnetic field. The etalon contains a liquid crystal film 83 microns thick. There is no disclosure of electric field bias being applied to the liquid crystal, nor of switching speed as a function of electric field.

$R_5$ discloses optical bistability in a liquid crystal cell comprising two glass plates with an intervening layer of liquid crystal material 50 microns thick. The cell is located between two semi-reflecting mirrors forming a Fabry-Perot etalon. As in $R_4$, there is no disclosure of electric field bias applied to the liquid crystal.

To summarise, Fabry Perot etalons filled with liquid crystal material or containing cells filled with liquid material are known in the prior art. However, they are either employed in applications for which response speed as a function of electrical bias is not important, ($R_1$, $R_3$, $R_4$ and $R_5$), or alternatively considerable difficulty is experienced in achieving rapid response. In $R_2$ in particular, temperature control of the liquid crystal material to less than 1° C. is required, together with switching voltages of 50 V or more, for the purposes of achieving switching times in the order of one millisecond or less.

Generally speaking, and as evidenced by the prior art cited in $R_2$, electro-optic effects observed in nematic liquid crystal materials are too slow (10–200 milliseconds) for use in optical signal processing. Simple nematic devices such as the Freedricks cell or twisted nematic structure are not only comparatively slow, but are slwo somewhat insensitive to applied voltage. They require re-orientation of the nematic director by up to 90° to achieve full contrast switching. The Freedricks cell exhibits greatest optical sensitivity as a function of applied electrical bias at the Freedricks transition voltage, ie the bias voltage above which the refractive index becomes sensitive to electrical bias. Conventional nematic liquid crystal displays switch between first and second bias voltages above and below the Freedricks transition respectively. Displays are however far less critical as regards operating speed requirements than optical modulators.

SUMMARY OF THE INVENTION

It is an object of the present invention to provide an electro-optic light modulator exhibiting comparatively high speed switching at comparatively low voltage.

The present invention provides an electo-optic modulator comprising a Fabry-Perot etalon containing intracavity liquid crystal material a biasing means for applying a variable bias voltage to the material, the bias voltage being variable between two values both of which are above an etalon threshold voltage above which the liquid crystal material refractive index is sensitive to electrical bias.

It has been found surprisingly that the response or switching speed of a liquid crystal-filled Fabry-Perot etalon between optical transmission states is greatly enhanced, up to one hundred-fold, when the etalon bias is varied between levels both of which are above the threshold for refractive index sensitivity to applied voltage. This is as compared to conventional biassing arrangements for liquid crystal display devices in which the bias is switched from below to above the threshold. In nematic liquid crystal devices, the threshold is referred to as the Freedricks transition, and a related threshold exists for other devices. Whereas switching from above to below the threshold is comparatively slow, switching between two bias voltages both above the threshold in a Fabry-Perot etalon has been surprisingly found to produce very much faster optical modulation times. Futhermore, although above-threshold voltages are employed, they remain merely of the order of a few volts and compatible with conventional digital electronic circuits. In contradistinction, the prior art of $R_2$ requires about 50 volts, ten times conventional digital circuit voltages, and requires accurate temperature control in addition.

The biasing means is preferably arranged to supply at least two bias voltages both of which are in the interval between 2 $V_T$ and 20 $V_T$, where $V_T$ is the threshold voltage. Conveniently the bias voltages are in the range 5 $V_T$ to 10 $V_T$ for an etalon containing nematic liquid crystal material.

The etalon may comprise mirrors in the form of semi-transparent silvered glass with reflectivity in the range 85-90%. In this case the silver layers may also act as electrodes to which the biasing means is connected. Alternatively, dielectric multilayer mirrors may be employed having transparent electrode layers such as indium tin oxide applied thereto.

The etalon mirrors are pre-treated to provide liquid crystal molecuar orientation. The orientation with respect to the mirror surfaces may be homogeneous (parallel) for a nematic material having a positive dielectric anisotropy ($\Delta\epsilon > 0$). For a nematic material with $\Delta\epsilon < 0$, a tilted homeotropic alignment may be employed in which the molecules are aligned between 2° and 10° to the perpendicular to cell walls. Alternatively, nematic material with $\Delta\epsilon > 0$ may be arranged for hybrid alignment, ie homogeneous at one mirror and homeotropic at the other. Nematic material having $\Delta\epsilon > 0$ may also be employed in the known "$\pi$-cell" structure. Nematic material having low birefringence may be arranged in the known "twisted $2\pi$" structure. Ferroelectric chiral smectic material with homogeneous alignment may also be employed.

In an alternative aspect, the invention provides a method of obtaining light beam modulation comprising the steps of:
(1) providing a Fabry-Perot etalon containing intracavity liquid crystal material and bias electrodes arranged to bias the material,
(2) passing light through the etalon cavity, the light having an intensity below that at which optical bistability would occur in the liquid crystal material,
(3) varying electrtode bias voltage between two values both of which are above an etalon threshold voltage above which the liquid crystal material refractive index is sensitive to electric bias.

The bias voltage may be varied between two voltages both in the range 2 $V_T$ and 20 $V_T$, preferably 5 $V_T$ to 10 $V_T$, where $V_T$ is the said threshold voltage. The etalon construction and the liquid crystal material may be in accordance with the aforesaid optical modulator aspects of the invention.

BRIEF DESCRIPTION OF THE DRAWING FIGURES

In order that the invention might be more fully understood, embodiments of the invention will now be described, with reference to the accompanying drawings, in which:

FIG. 1 schematically shows an optical modulator of the invention;

DETAILED DESCRIPTION OF THE PREFERRED EMBODIMENTS

Figure 1:
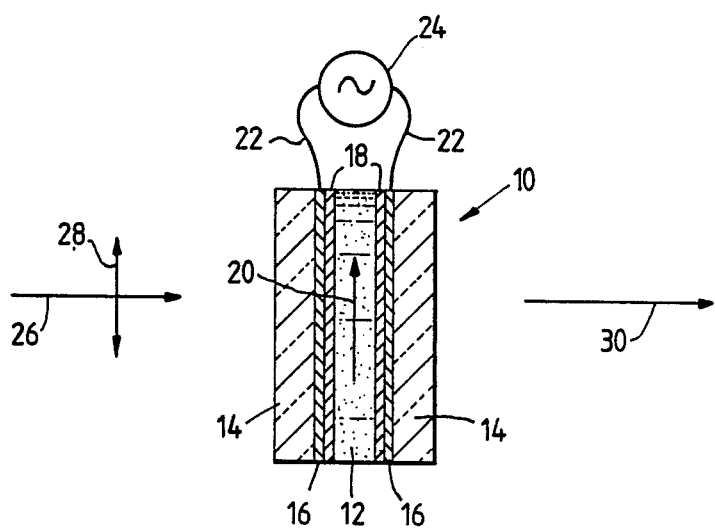

Referring to FIG. 1, there is shown an optical modulator of the invention comprising Fabry-Perot etalon 10 (not drawn to scale) containg intra-cavity liquid crystal material 12. The material 12 is that designated E43, which is nematic material and is commercially available from BDH Chemicals, a British company. The liquid crystal material is 10 microns in thickness, a thickness in the range 5-20 microns being suitable. The etalon 10 comprises two glass plates 14 each with a respective internal mirror layer 16. The mirror layers 16 have reflectivities in the range 85% to 90% and are formed by deposition of silver. Each mirror layer bears a respective rubbed polyimide layer 18, which aligns the long axes of the liquid crystal molecules parallel to the plates 14 as indicated by an arrow 20 (homogeneous alignment).

The mirror layers 16 also act as electrodes for applying an electrical bias field to the liquid crystal material 12. They have electrical connections 22 linking them to an AC voltage source 24 having a frequency of 10 kHz. As is well known in the liquid crystal field, these materials respond to the rms value of an applied AC field, and a frequency in the range 10 Hz to 100 kHz is suitable.

The etalon 10 is employed to modulate the intensity of an incident light beam 26. The beam 26 is polarised as indicated by an arrow 28 parallel to the liquid crystal molecular alignment 20. Light transmitted by the etalon 10 is indicated at 30. To avoid optical bistability (see R4 and R5), the light beam 26 has an intensity of less than 100 Watt/cm².

The optical transmission T of the etalon 10, ie the ratio of the transmitted light intensity to that incident, is given by the expression:

$$T = \frac{[1 - A/(1 - R)]^2}{[1 + F\sin\delta]^2} \quad (1)$$

where:
$F = 4R/(1-R)^2$
A = mirror 16 absorption expressed as a fraction of incident intensity,
R = mirror 16 reflectivity expressed as a fraction of incident intensity,
δ = optical phase change in etalon cavity = $\phi + 2\pi nt/\lambda$,
n and t are the refractive index and thickness of the liquid crystal material 12,
λ = wavelength of incident light beam 26, and
φ = phase change experienced by light beam 26 on reflection at a mirror 16.

When no voltage is applied across the mirrors 16, ie when the source 24 is switched off, the incident light beam 26 experiences the extraordinary refractive index $n_e$ of the liquid crystal material 12. This is because the incident beam polarisation 20 is parallel to the homogeneous molecular alignment 28. For material E43, $n_e$ is approximately 1.7.

The voltage source 24 is arranged to provide a 10 kHz signal of magnitude greater than the Freedricks threshold (to be described later) in the liquid crystal material. The applied voltage changes the molecular orientation of the material 12, which is in the present example (E43) has positive dielectric anisotropy. As a result of molecular re-orientation, there is a change in the refractive index n of the material 12 experienced by the incident light beam 26. The optical phase change δ in the etalon 10 consequently alters, and so also the etalon transmission T given by Equation (1). T is accordingly tunable by varying the cell voltage.

Figure 2:
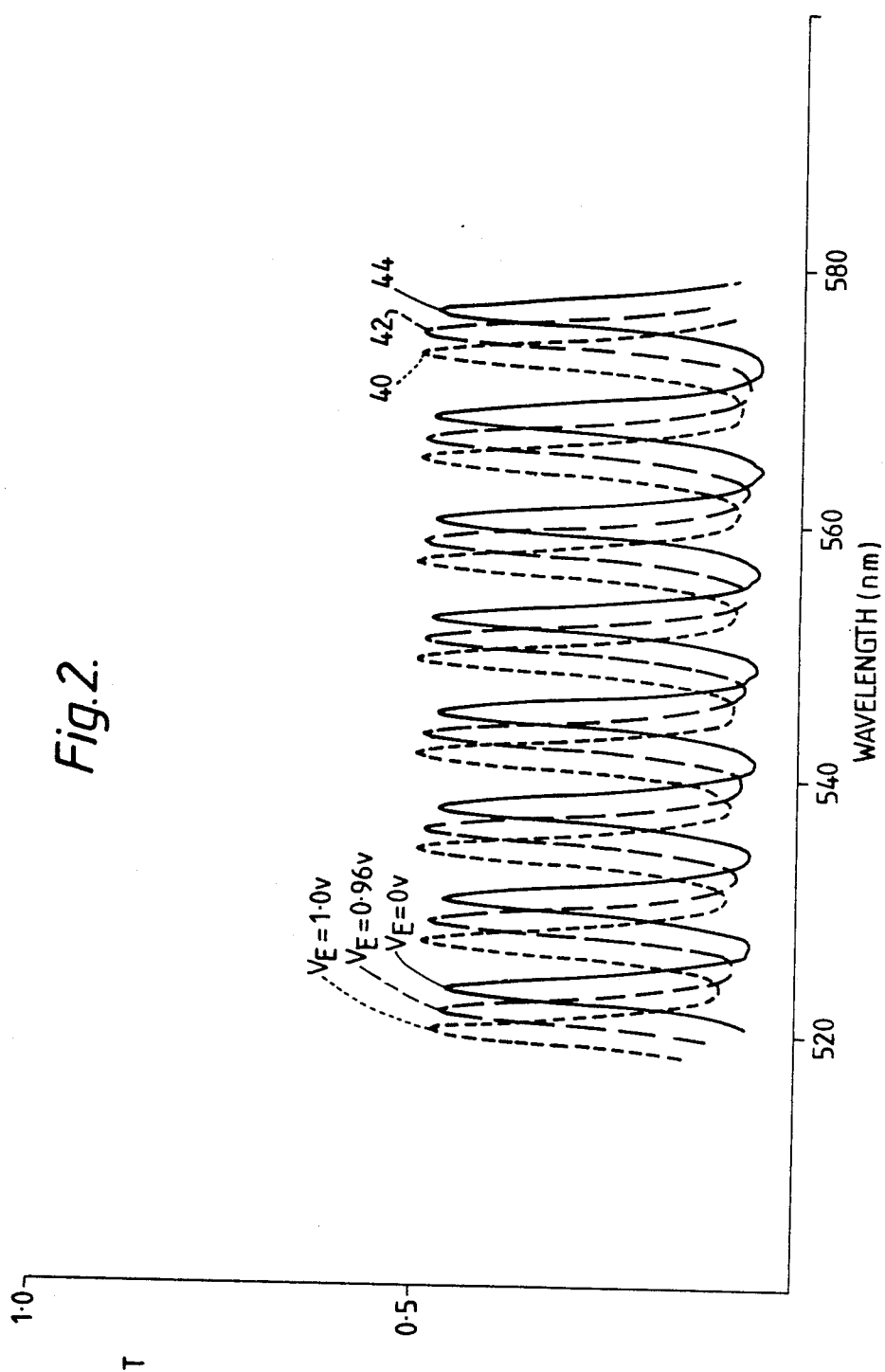
FIG. 2 illustrates optical transmission of the FIG. 1 modulator as a function of wavelength for three values of bias voltage.

Referring now to FIG. 2, etalon transmission T is shown plotted against incident optical wavelength in three graphs 40, 42 and 44 for etalon bias voltages $V_E$ of 1.0 V, 0.96 V and 0 respectively. In this example, the Freedricks threshold occurs at 0.96 V approximately. Each of the graphs 40, 42 and 44 consists of the well-known Fabry-Perot characteristic of maxima and minima which are regularly spaced as a function of wavelength. It can be seen that maxima of graph 44 are very close to minima of graph 40, and maxima of graph 42 are approximately midway between those of graphs 40 and 44. Accordingly, a change of etalon voltage of only 40 mV, 0.96 V to 1.0 V, tunes the etalon 10 from a maximum on graph 42 to less than half maximum on graph 40. A similar change between graphs 42 and 44 (0 V) requires 0.96 V, twenty-four times larger. This illustrates the considerable increase in sensitivity of refractive index to applied voltage produced by increasing the voltage above the Freedricks threshold.

Although the refractive index of the liquid crystal material is very sensitive to etalon voltage immediately above the Freedricks threshold or transition, it has been found that the molecular re-orientation required is characterised by a time constant in the range 10-100 milliseconds for E43 and similar nematic materials. This is adequate for conventional liquid crystal displays, but it is unacceptably long for optical signal processing and other optical modulation applications.

Figure 3:
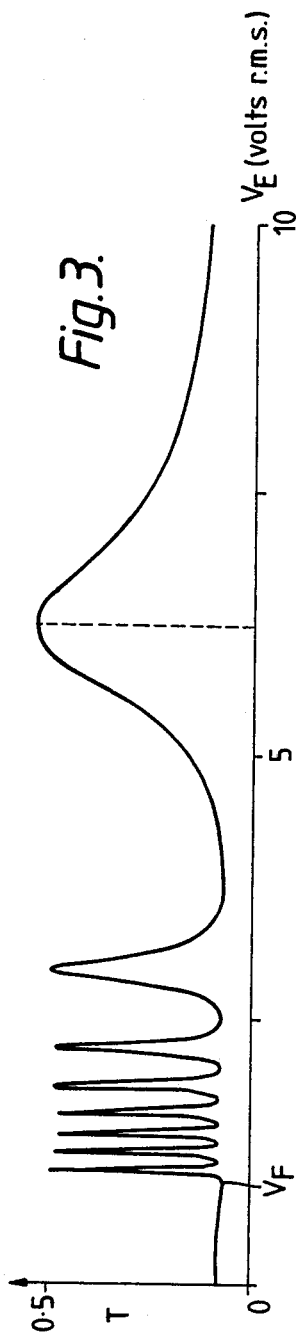
FIG. 3 is a graph of optical transmission of the FIG. 1 modulator as a function of bias voltage.

Referring now to FIG. 3, there is shown a graph 50 of etalon transmission T against etalon rms voltage at an incident wavelength of 632.8 nm. The Freedricks voltage $V_F$ is shown, this being a little less than one volt in the present example. Increasing the etalon voltage above $V_F$ tunes T through a series of maxima and minima, which become broader as the voltage increases and the voltage sensitivity of the liquid crystal refractive index reduces. For an applied voltage change from 4 V to 6 V (both well above $V_F$), transmission changes monotonically from minimum to maximum.

Figure 4:
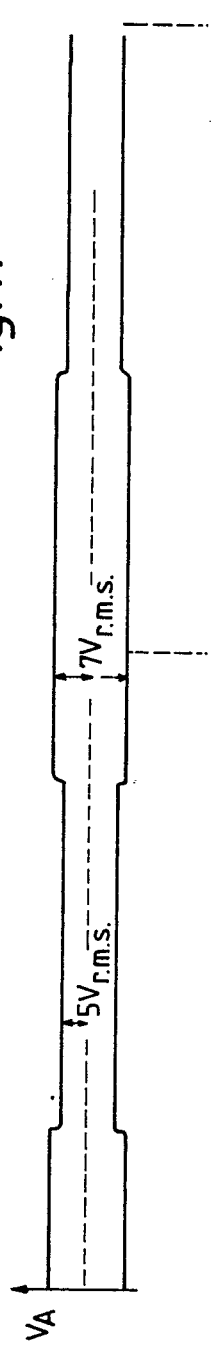
FIGS. 4 and 5 are respectively graphs of modulator bias voltage and optical transmission as a function of time in both cases.
Figure 5:
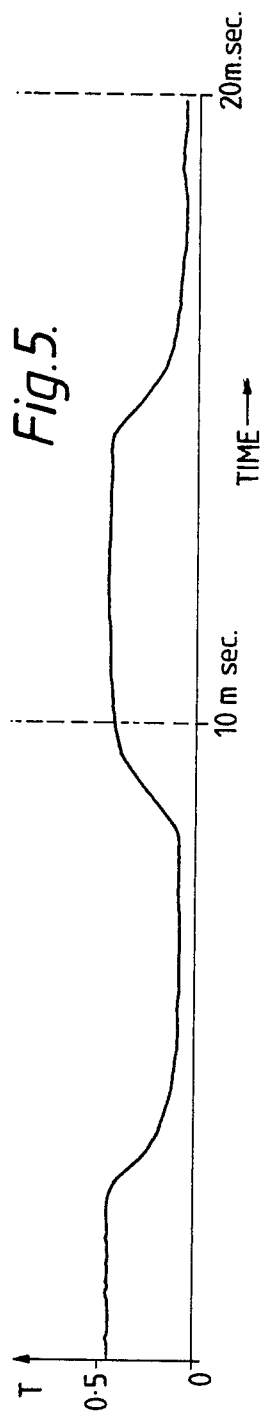

Referring now also to FIGS. 4 and 5, there are shown graphs 52 and 54 respectively of etalon voltage amplitude $V_A$ and transmission T both plotted against time on the same abscissa axis (0-20 milliseconds). $V_A$ is in fact a square wave, and the rms value is half the peak value as illustrated. It alternates between 5 and 7 volts rms with a cycle time of a little under 12 milliseconds. Etalon transmission T responds to $V_A$ variation by changing from 0.06 to 0.46. Furthermore, T changes with a response time of 1.08 milliseconds measured between an initial value in switching and a value after switching which is (1−1/e) of its final value. A conventional nematic liquid crystal shutter lacking the Fabry-Perot structure would have a response time in the 10-100 millisecond region. The combination of a Fabry-Perot structure and a voltage source arranged to switch between voltages both above $V_F$ accordingly improves switching time by a factor of between 10 and 100 approximately. This is achieved using voltages compatible with integrated circuit technology, roughly an order of magnitude lower than the prior art of R2. Furthermore, unlike R2, accurate temperature control with power consuming heaters is not required.

The results displayed in FIGS. 4 and 5 are also tabulated as the uppermost entries in Table 1. In addition, similar results for material E43 are shown at etalon voltages of 1.75 V (ON) and 2 V (OFF), these being much closer to the Freedricks voltage $V_F$. The effect of employing etalon voltages closer to $V_F$ is greatly to increase the transmission switching time; ie the time to switch from high to low transmission worsens from 0.88 to 17.2 milliseconds, and the time for the reverse process increases from 1.08 to 43.0 milliseconds.

The Freedricks transition is a phenomenon observed in nematic liquid crystal cells. Such cells have a molecular alignment which is imposed by pretreating the surfaces in contact with the liquid crystal material. Thus simple nematic materials such as E43 with positive dielectric anisotropy are employed with so-called homogeneous alignment parallel to cell walls. Other configurations will be described later. By virtue of this alignment, mechanical work must be done on the molecules to re-orientate them. The Freedricks transition occurs that voltage at which control of molecular orientation switches from that due to cell wall boundary conditions to that due to applied voltage. The Freedricks voltage $V_F$ is independent of cell thickness of nematic materials, because the electric field in a cell and the energy required to induce the transition are both inversely proportional to cell thickness.

In addition to the foregoing example of a Fabry-Perot etalon with homogeneous alignment of intra-cavity E43 nematic material, the following alternatives may be employed in accordance with the invention:

(a) material having a negative dielectric anisotropy and a tilted homoeotropic molecular alignment inclined at an angle between 2° and 10° to the perpendicular to etalon mirrors;

(b) material having a positive dielectric anisotropy and arranged with hybrid molecular alignment, ie the alignment is homogeneous (parallel) at one etalon wall and homoeotropic (perpendicular) at the other;

(c) material having a positive dielectric anisotropy with a so-called "$\pi$-cell" structure; ie molecules have alignment parallel to etalon walls, but the alignmentt twists through 180° through the etalon cavity. The $\pi$ cell structure is described by P J Bos et al in SID '83 Digest pp 30–31, May 1983;

(d) material having low birefringence and arranged in a twisted "$2\pi$" structure. This provides enhanced tuning for all polarisations of incident light rather than merely plane-polarised light. The structure has homogeneous alignment, and is described by D L White and G N Taylor, J. Appl. Phys. Vol. 45, No. 11, pp 4718–4723, November 1974. White et al describe a structure incorporating a dye, which is not employed in the present invention.

(e) ferroelectric chiral smectic material $S_c^*$ which has an inherently fast response time, but is enhanced by incorporation in a Fabry-Perot etalon. In this example the etalon cavity thickness should be in the range 1–6 microns. The surface alignment is homogeneous at both mirror surfaces.

Examples of materials for use in (a) to (e) above are as follows:

(1) Materials with a positive dielectric anisotropy:
(i) Material E43, which is a mixture of:

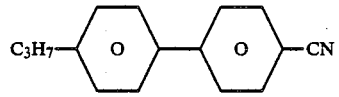

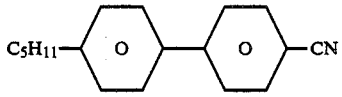

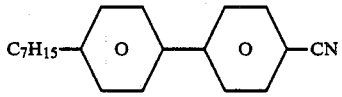

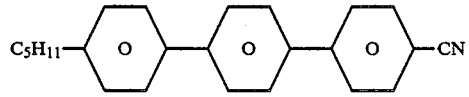

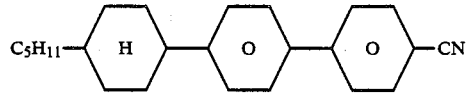

(ii) Material ZLI 1132

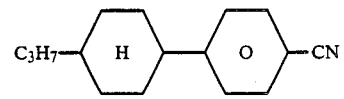

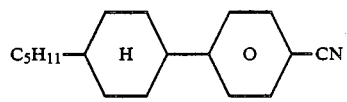

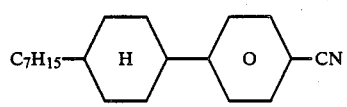

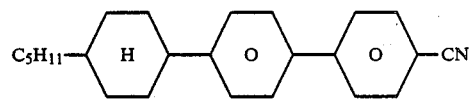

(2) Material with a negative dielectric anisotropy: a mixture of fluorinated bicyclo-octane esters, which is 45% (i) and 55% (ii) where (i) and (ii) are:

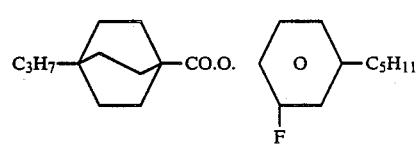

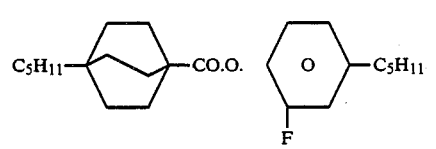

(3) Low birefringent materials: Host material doped with a cholesteric dopant to produce an approximately $2\pi$ twist within an etalon.

Host: Mixture of:

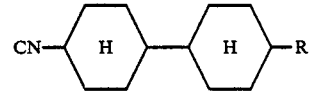

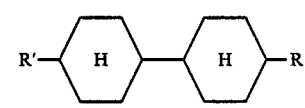

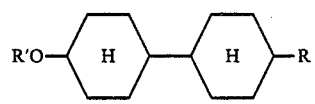

This host provides birefringence in the range 0.3 to 0.8.

Cholesteric Dopant: CB15 (BDH):

A 2% concentration of this dopant in the host provides a 2π twist in an etalon cavity 6 microns wide.

(4) Ferroelectric Materials: Examples of these are set out in PCT publication no. W086/04327 and published European application no. EP 0121841.

Strictly speaking, the Freedricks transition is defined only for nematic materials and devices such as (a) to (d) above. However, for other materials such as (e), when incorporated in a Fabry-Perot etalon, they exhibit a threshold voltage at which the refractive index changes from comparatively insensitive to applied voltage to considerably more sensitive. This threshold arises in an analogous fashion to the Freedricks threshold, in that molecular orientation changes from that controlled, by cell or etalon wall boundary to that controlled by applied field. Unlike nematic materials, the threshold voltage in ferroelectric smectic devices is proportional to cell thickness, so strictly speaking there is a constant threshold electric field rather than a current threshold voltage. The threshold voltage is however a constant for a given cell.

The embodiment of the invention described with reference to FIG. 1 incorporated semi-transparent etalon mirrors 16, which acted as biassing electrodes in addition to their reflector purposes. Mirrors in the form of dielectric multilayers of known kind may alternatively be employed; in this case transparent electrode layers must be applied to the mirror surfaces, such as layers of indium tin oxide commonly used in liquid crystal displays.

I claim:

1. An electro-optic modulator including a Fabry-Perot etalon containing intra-cavity liquid crystal material and biasing means for applying a bias voltage to the material, the bias voltage being variable between two values both of which are above an etalon threshold voltage $V_T$ above which the liquid crystal material refractive index is sensitive to electrical bias.

2. A modulator according to claim 1 wherein the bias voltage is variable between two values of which are in the range 2 $V_T$ to 20 $V_T$, and between which the etalon exhibits a monotonically changing optical transmission.

3. A modulator according to claim 2 wherein the bias voltage is variable between two voltages both in the range 5 $V_T$ to 10 $V_T$.

4. A modulator according to claim 2 wherein the etalon has a cavity width in the range 5 to 20 microns and the liquid crystal material is nematic with positive dielectric anisotropy and homogeneous alignment relative to internal etalon walls.

5. A modulator according to claim 2 wherein the etalon has a cavity width in the range 5 to 20 microns and the liquid crystal material has negative dielectric anisotropy and a tilted homeotropic alignment inclined to the perpendicular to etalon walls at an angle in the range 2° to 10°.

6. A modulator according to claim 2 wherein the etalon has a cavity width in the range 5 to 20 microns and the liquid crystal material has positive dielectric anisotropy and has hybrid molecular alignment.

7. A modulator according to claim 2 wherein the etalon has a cavity width in the range 5 to 20 microns and the liquid crystal material has a positive dielectric anisotropy and a π-cell alignment twist.

8. A modulator according to claim 2 wherein the etalon has a cavity width in the range 5 to 20 microns and the liquid crystal material has low birefringence and has a 2π alignment twist.

9. A modulator according to claim 2 wherein the etalon has a cavity width in the range 1 to 6 microns and the liquid crystal material is a ferroelectric smectic with homogeneous alignment.

10. A method of obtaining optical modulation including the steps of:
    (1) providing a Fabry-Perot etalon containing intra-cavity liquid crystal material and bias electrodes arranged to bias the material,
    (2) passing light through the etalon cavity, the light having an intensity below that at which optical bistability would occur in the liquid crystal material, and
    (3) applying bias voltage to the bias electrodes, the bias voltage being variable between two values both of which are above an etalon threshold voltage above which the liquid crystal material refractive index is sensitive to electrical bias.

* * * * *